US012752694B2

(12) United States Patent
Factor et al.

(10) Patent No.: US 12,752,694 B2
(45) Date of Patent: Oct. 6, 2026

(54) WELL BUILT TRAILER

(71) Applicants: Vladimir Factor, Calabasas, CA (US); Ashkan Okhovat, Calabasas, CA (US)

(72) Inventors: Vladimir Factor, Calabasas, CA (US); Ashkan Okhovat, Calabasas, CA (US)

( * ) Notice: Subject to any disclaimer, the term of this patent is extended or adjusted under 35 U.S.C. 154(b) by 1022 days.

(21) Appl. No.: 17/540,739

(22) Filed: Dec. 2, 2021

(65) Prior Publication Data

US 2023/0173971 A1 Jun. 8, 2023

(51) Int. Cl.
*B60P 3/14* (2006.01)
*A63B 21/00* (2006.01)
(Continued)

(52) U.S. Cl.
CPC ................ *B60P 3/14* (2013.01); *A63B 21/00* (2013.01); *A63B 22/00* (2013.01);
(Continued)

(58) Field of Classification Search
CPC .... B60P 3/14; B60P 3/025; B60P 3/34; A63B 21/00; A63B 22/00; A63B 24/0075;
(Continued)

(56) References Cited

U.S. PATENT DOCUMENTS 4,535,933 A * 8/1985 Kuiper .................... B60P 3/341 296/26.02
4,958,874 A * 9/1990 Hegedus ............... B60P 3/0252 52/79.5
(Continued)

*Primary Examiner* — Kevin Hurley
*Assistant Examiner* — Marlon A Arce

(57) ABSTRACT

A mobile-exercise trailer is designed to facilitate group fitness training in a portable and versatile format, making it ideal for military bases, corporate wellness programs, campuses, resorts, and other remote or outdoor training environments. The trailer includes a platform equipped with various exercise apparatuses, including removably attachable power racks, a pulley system, and compact adjustable weights such as adjustable kettlebells. Two sidewalls are joined to the platform, each supporting automated wing doors that function as protective awnings and include an integrated mister system for cooling during outdoor workouts. A dual-section rear door system comprises an upper canopy-style door with a pull-up bar and a lower ramp door, providing access and additional workout space.

The trailer features an AI-powered virtual training system, where ultra-high-lumen, weather-proof monitors display customized workout sessions. The AI dynamically designs and broadcasts training classes based on the trailer's location, real-time weather conditions, the age and fitness level of participants, and specific training goals. The system offers a variety of workouts, including HIIT, weightlifting, CrossFit, and MMA, and connects to a cloud-based content management platform via satellite internet for real-time updates and live-streamed workouts, while also storing pre-recorded classes for offline use.

Powered by a solar energy system with storage batteries, the trailer operates in off-grid and remote locations and can be recharged via an EV charger, AC power, or generator. A hydraulic lift is integrated into at least one wing door for controlled operation. The trailer is stabilized by leveling feet for use on uneven terrain, and a manual or remote-controlled trailer dolly extends from the front, allowing easy maneuverability.

3 Claims, 4 Drawing Sheets

(51) Int. Cl.
*A63B 22/00* (2006.01)
*A63B 24/00* (2006.01)
*B60P 3/025* (2006.01)
*B60P 3/34* (2006.01)

(52) U.S. Cl.
CPC .......... *A63B 24/0075* (2013.01); *B60P 3/025* (2013.01); *B60P 3/34* (2013.01); *A63B 2210/50* (2013.01)

(58) Field of Classification Search
CPC ..... A63B 2210/50; A63B 69/22; A63B 17/04; A63B 21/00047; A63B 21/16; A63B 2071/026; A63B 2071/0694; A63B 21/4029; A63B 2225/09; A63B 2225/11; A63B 71/02; A63B 71/023; A63B 69/222; A63B 2225/20; A63B 2244/102; A63B 71/0036; A63B 71/0622; A63B 69/305; A63B 2071/025; A63B 2071/0625; A63B 2209/10; A63B 2210/06; A63B 2220/803; A63B 2225/093; A63B 2225/10; A63B 2225/50; A63B 2225/685; A63B 2225/74; A63B 2244/10
See application file for complete search history.

(56) References Cited

U.S. PATENT DOCUMENTS

| | | | | |
|---|---|---|---|---|
| 5,667,267 | A | 9/1997 | Talucci | |
| 7,360,813 | B2 * | 4/2008 | Ting | A61G 3/001 296/65.05 |
| 8,864,207 | B2 * | 10/2014 | Hixson | B60P 3/0257 296/22 |
| 9,080,326 | B2 * | 7/2015 | Johnson | E04H 15/54 |
| 9,750,999 | B2 | 9/2017 | Monaco | |
| 9,862,299 | B2 * | 1/2018 | Johnson | B60P 3/00 |
| 10,225,490 | B2 | 3/2019 | Ustun et al. | |
| 11,919,436 | B2 * | 3/2024 | Guffey | A63B 71/02 |
| 2014/0296037 | A1 | 10/2014 | Razzaq | |
| 2016/0059104 | A1 * | 3/2016 | Monaco | A63B 71/023 280/30 |
| 2016/0059105 | A1 | 3/2016 | Scade Garcia | |
| 2017/0096091 | A1 * | 4/2017 | Johnson | B60R 99/00 |
| 2018/0272825 | A1 * | 9/2018 | Eagleton | B60P 3/0255 |
| 2020/0130559 | A1 * | 4/2020 | Calabria | B62D 63/08 |
| 2021/0339602 | A1 * | 11/2021 | Holly | B60H 1/00014 |
| 2022/0362610 | A1 * | 11/2022 | Alberione | A63B 71/02 |

* cited by examiner

WELL BUILT TRAILER

BACKGROUND

Technical Field

The present disclosure generally relates to outdoor exercise equipment, and more particularly, to Indoor and Outdoor smart mobile exercise platforms, and virtual training platforms.

Description of the Related Art

Mobile exercise platforms can be used to strategically place exercise equipment in areas that may or may not have fitness centers.

A mobile virtual training platform can be used and strategically placed to teach and guide participants through various occupancies and trades. Such trailers are brought to certain locations for either a limited period of time each day, week, month, or in a permanent location.

SUMMARY

In one embodiment, a mobile-exercise trailer includes a platform having at least one exercise equipment arranged thereon. Two sidewalls each have a first end joined to the platform, and at least one of the two sidewalls has a window. A first door is arranged to cover the window in the at least one sidewall. A roof is attached to a second end of each of the two sidewalls, and at least one power rack is retractably extendable from one of the two side walls.

In an embodiment, the first door comprises a wing door.

In an embodiment, at least two wheels axially arranged below a portion of the two sidewalls; and a trailer dolly connection extends from a front of the mobile-exercise trailer.

In an embodiment, the trailer dolly has a manual and/or a remote control.

In an embodiment, the mobile-exercise trailer a pair of stabilizing jacks arranged below the platform.

In an embodiment, the power rack is pivotable from within the window in the at least one sidewall.

In an embodiment, a monitor is arranged on one of the sidewalls, where the monitor is configured to display exercise workout and/or virtual training videos.

In an embodiment, at least two monitors are respectively arranged on the two sidewalls.

In an embodiment, a second power rack is attached to a second sidewall of the two sidewalls, and the first power rack is attached to a first sidewall of the two sidewalls.

In an embodiment, a second wing door is attached to a second sidewall of the two sidewalls.

In an embodiment, a hydraulic lift is attached to at least one of the two wing doors. In an embodiment, the first power rack and the second power rack further include leveling feet.

In an embodiment, a cargo ramp is pivotally attached to a rear of the mobile-exercise trailer.

In an embodiment, a height-adjustable pull-up bar is attached to an upper part of the rear of the mobile-exercise trailer.

In an embodiment, a soundbar can be arranged on a rear side or multiple sides of the mobile-exercise trailer.

In an embodiment, at least two or more marine speakers are arranged on each sidewall of the two sidewalls.

In an embodiment, each of the two or more marine speakers is arranged under a monitor of the two or more monitors.

In an embodiment, attachment strips are arranged on at least one of the two sidewalls. In an embodiment, at least one of a dip-bar, a wall ball target, and a punching bag is connected to the attachment strips.

In an embodiment, a solar panel and/or multiple solar panels are arranged on the roof, and inside the mobile exercise trailer is a power box arranged to store one or more of a power supply, batteries, an inverter, and a solar charger, an amplifier, and/or an audio head unit.

In one embodiment, a method of manufacturing a mobile exercise trailer, the method includes the operations of providing a platform configured for receiving at least one exercise equipment arranged thereon. Attaching two side walls to the platform, wherein at least one of the two sidewalls has a window. Arranging a first door to cover the window in the at least one sidewall. A roof is attached to a second end of each of the two sidewalls. A solar panel is attached to the roof. A power rack is attached to the trailer to retractably extends from one of the two side walls. A monitor is attached to each sidewall of the two sidewalls. Providing at least two wheels axially arranged below a portion of the two sidewalls, and arranging a trailer dolly connection extending from a front of the mobile-exercise trailer.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or operations that are illustrated. When the same numeral appears in different drawings, it refers to the same or like components or operations.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high level, without detail, to avoid unnecessarily obscuring aspects of the present teachings.

The term "window" as used herein is to be interpreted broadly and may include any type of opening in a sidewall, front or rare of the mobile exercise trailer.

The term "door" refers to any type of door, generally attached to the body of the trailer via a hinge. Doors used in a trailer include but are not in any way limited to awning doors, wing doors, and gull-wing doors. Although the doors shown and described herein are a "wing-type" (pivoting above) the trailer construction is not so limited. The doors can be hinged on the sides or the bottom. In addition, sliding panels may be used that fit within recesses in the sidewalls.

While the drawings shown herein show two wheels axially arranged, the mobile exercise trailer shown and described herein is not limited to this arrangement. Three or four wheels may be used. As the trailer is shown with a hitch that can be towed by a vehicle, the rear of the trailer may include brake lights and associated hardware for connection to the towing vehicle. Although a single solar panel is shown on the roof of the trailer, multiple solar panels may be arranged to the roof, sidewalls, front and rear of the trailer.

The exercise equipment shown inside the trailer includes weight racks. However, it is to be understood and appreciated that virtually any type of exercise and/or training equipment can be stored inside, including balls, tennis rackets, exercise mats, yoga mats, jump-ropes, kettlebells, dumbbells, a virtual pully weight, and a trainer station, just to name a few non-limiting examples.

Figure 1:
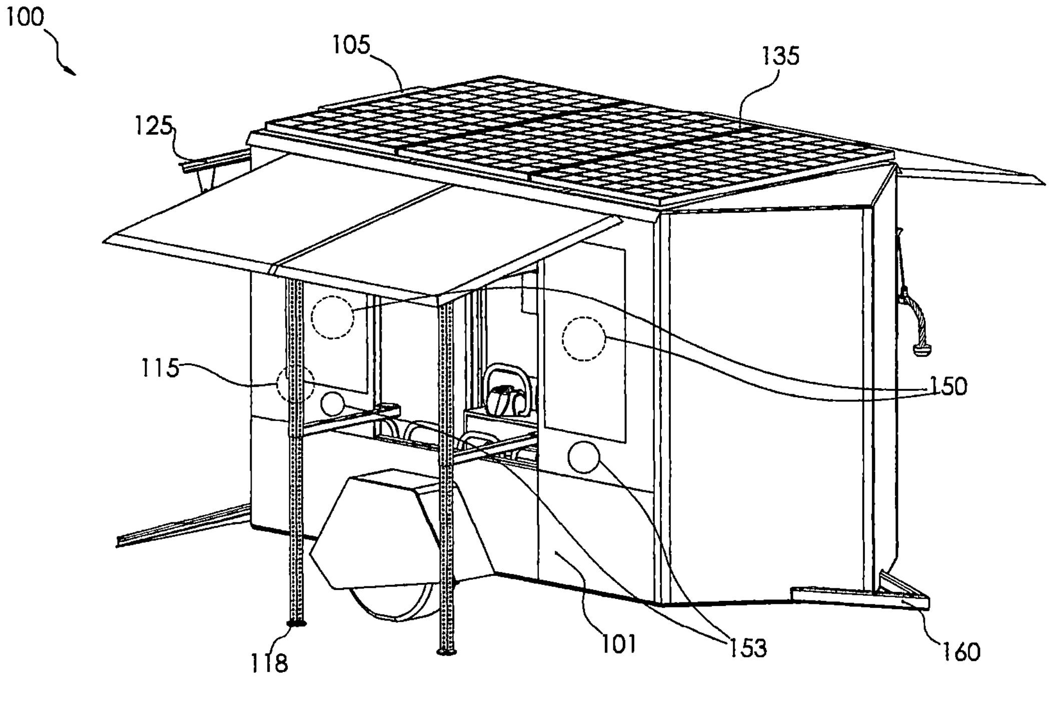
FIG. 1 shows a perspective view from a right side of a mobile-exercise trailer according to an embodiment of the present disclosure.

FIG. 1 shows a perspective view 100 from a right side of a mobile-exercise trailer according to an embodiment of the present disclosure. Referring to FIG. 1, the mobile-exercise trailer includes two side walls 101 having a window 117. Retractably extending power racks 115 are pivotable out of the window 117. The power racks 115 can be extended downward and have leveling feet 118. The power racks are used for heavy exercise equipment, a pully machine, or a virtual weight pully, including but in no way limited to barbells. A roof 105 is attached to upper ends of the sidewalls 101. A cargo ramp door 110 is pivotally attached to the rear of the trailer by a hinge (not shown) and leads to the platform 303 (shown in FIG. 3). A sound bar 105 is arranged to the rear of the trailer, not limited to one roof location nor limited to one soundbar, under a height-adjustable pull-up bar 125. At least one solar panel 130 may be arranged on the roof 105 to provide/supplement power used by electronics in the trailer, lighting, etc.

At least one monitor/tablet 150 is attached to one of the sidewalls, and may be configured to display workout videos, a display leaderboard, safety information/instructions, and virtual training. The monitor may have a wireless connection such as WiFi. Marine speakers 153 may be arranged adjacent the monitor 150. The trailer tongue 160, may have a coupler and a trailer lock attached for towing purposes and can also serve as a connection point for a trailer dolly or valet, including but not limited to a manual or remote-controlled trailer jack, to facilitate attachment to a towing vehicle or device.

Figure 2:
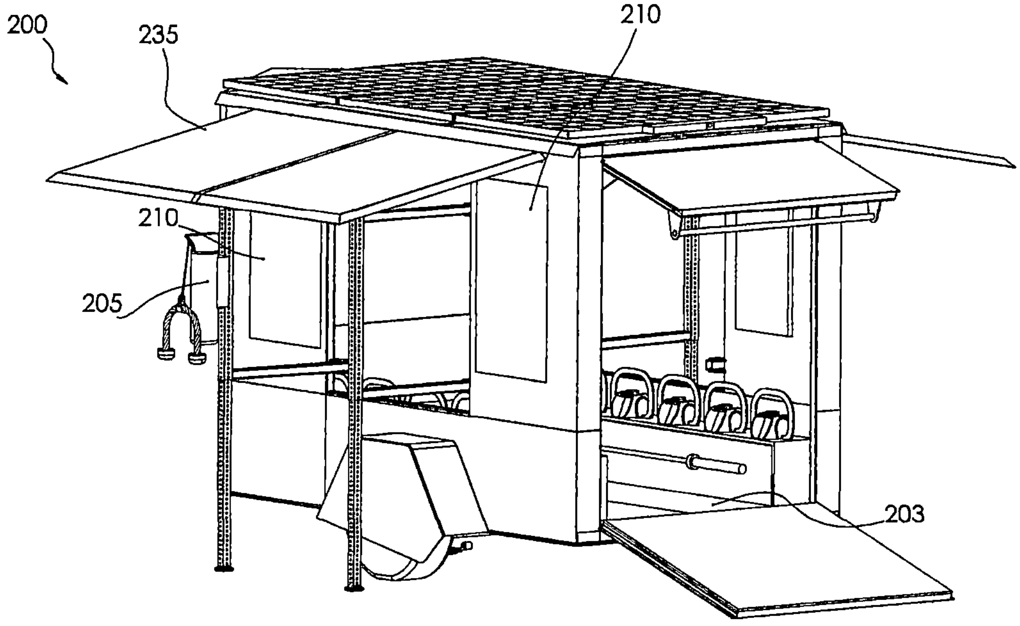
FIG. 2 shows a third perspective view from a rear according to an embodiment of the present disclosure.
Figure 3:
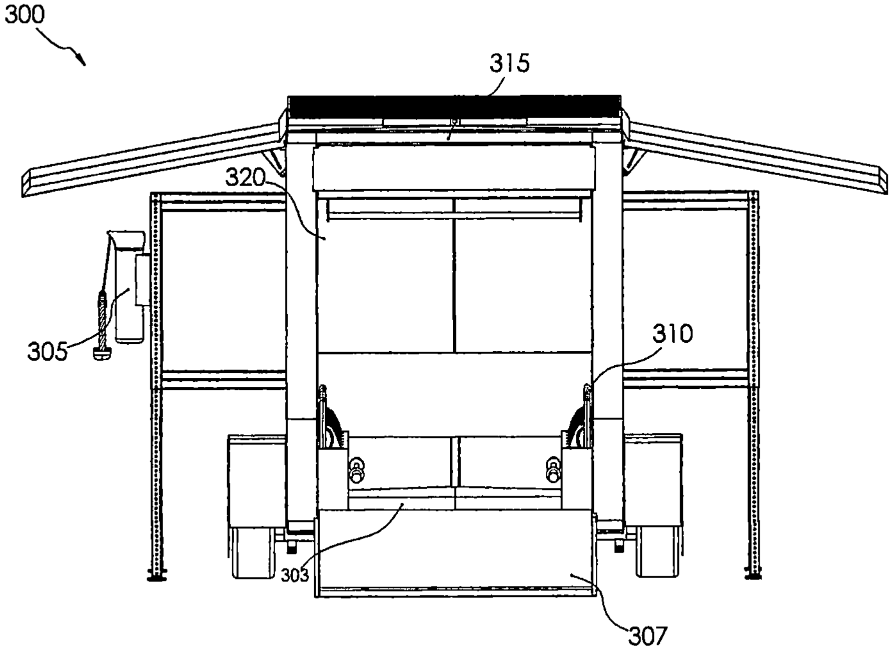
FIG. 3 illustrates a rear view of the mobile-exercise trailer according to an embodiment of the present disclosure.

FIG. 2 shows a third perspective view 200 from a rear of the trailer according to an embodiment of the present disclosure. A portion of the platform 203 is shown, and two monitors 210 display workout videos for people on workout areas in front of the monitors 210. An adjustable pulley system 205, in the form of a virtual weight is attached to the foldable squat racks. FIG. 3 illustrates a rear view 300 of the mobile-exercise trailer according to an embodiment of the present disclosure. The platform 303, a ramp door 307, adjustable kettlebell rack and storage for other equipments 310 are shown. At least one solar panel 315 is shown attached to the roof of the trailer as well as an internet receiver kit (not shown). The solar panel 315 may be used to recharge batteries that are used to power one or more of the monitors 210. The trailer can be charged via solar panels, or alternatively with a shore power DC, a generator, or a standard type1/type2 electric vehicle charging station track (not shown). A power box 320 is arranged inside the trailer. The power box 320 may be used to store one or more of a power supply, batteries, inverter, solar chargers, amplifier, audio head unit, and below that there is storage for other workout equipment.

Figure 4:
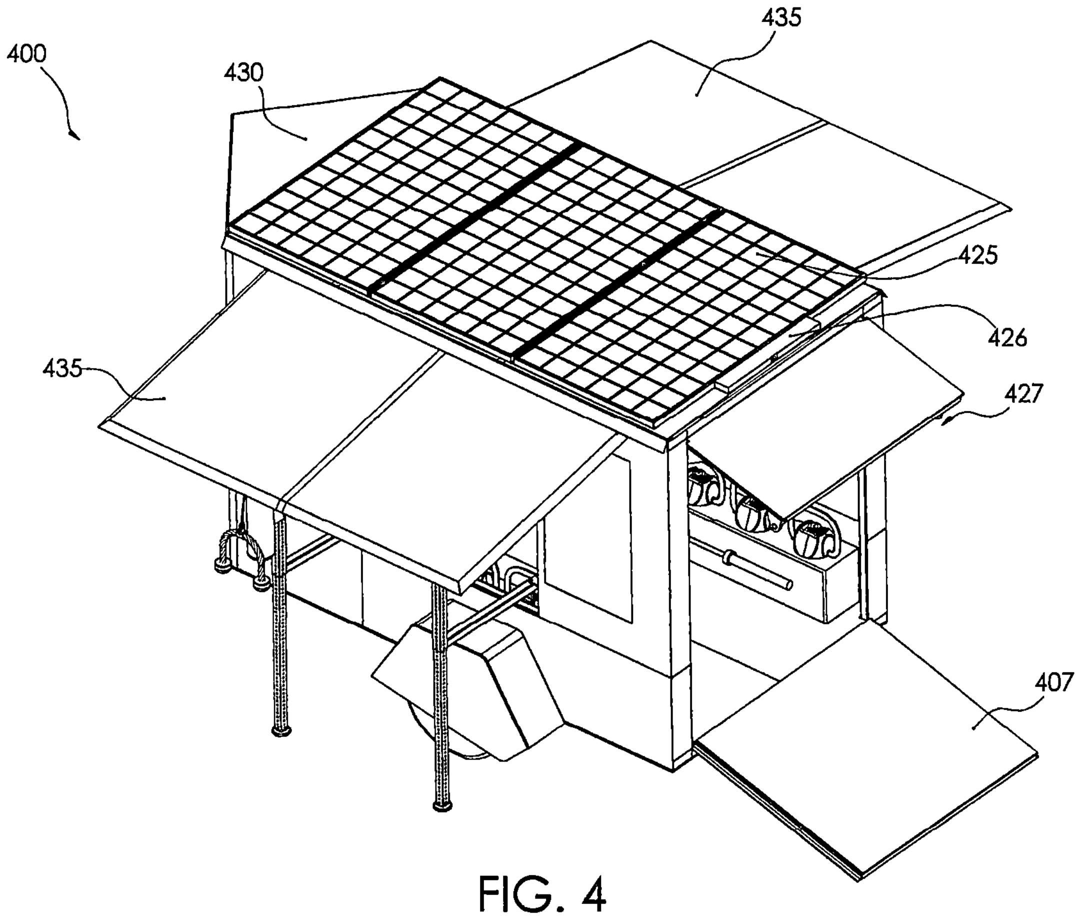
FIG. 4 is a top view of the mobile-exercise trailer according to an embodiment of the present disclosure.

FIG. 4 is a top view 400 of the mobile-exercise trailer according to an embodiment of the present disclosure. The cargo ramp 407, the top portion of the ramp door that opens upwards like the wing doors with an incorporated pull up bar into the platform 427, the wing doors 435, and the solar panel 425 on the roof 430 are all shown with enough space to attach an internet receiver kit (not shown), with the soundbar system 426, attached on the back portion of th. It is to be understood that the pull-up bars 427 are incorporated into the top portion of the back door.

A method of manufacturing the mobile-exercise trailer according to the present invention may include a series of operations, most of which do not have to be performed. For example, a method manufacturing the mobile-exercise trailer can include providing a platform (303 in FIG. 3) configured for receiving at least one exercise equipment arranged thereon. Two side walls are attached to the platform, wherein at least one of the two sidewalls has a window. A first door is arranged to cover the window in the at least one sidewall. A roof is attached to a second end of each of the two sidewalls can be performed. A solar panel is attached to the roof either prior or after the roof is attached to the sidewalls. A power rack is attached to the trailer to retractably extend from one of the two side walls. At least one monitor is attached to each sidewall of the two sidewalls. At least two wheels are axially arranged below a portion of the two sidewalls, and a trailer dolly connection is arranged extending from a front of the mobile-exercise trailer. Additional equipment may be added to the sidewalls, front or rear of the trailer as described herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The components, operations, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments of the disclosure are also contemplated. These include embodiments that have fewer, additional, and/or different components, steps, features, objects, benefits and advantages. For example, there may be ambient lights arranged inside the trailer and led lights attached inside the side wing doors. Projector lights can also be attached on the roof of the trailer to make night classes and trainings easier.

There are also embodiments of the disclosure in which the components and/or operations are arranged and/or ordered differently than described and shown herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A mobile-exercise trailer, comprising:

a platform having at least one exercise equipment arranged thereon;

two sidewalls that each have a first end joined to the platform, at least one of the two sidewalls having a window;

a first door arranged to cover the window in the at least one sidewall, wherein the first door comprises a wing door;

a roof attached to a second end of each of the two sidewalls;

at least a first power rack configured to retractably extend from one of the two sidewalls, wherein the first power rack is attached to a first sidewall of the two sidewalls;

a second power rack attached to a second sidewall of the two sidewalls; and a second wing door attached to the second sidewall of the two sidewalls.

2. The mobile-exercise trailer of claim 1, further comprising a hydraulic lift attached to at least one of the wing door and the second wing door.

3. The mobile-exercise trailer of claim 1, wherein the first power rack and the second power rack further include leveling feet.

* * * * *